United States Patent [19]

Pineau et al.

[11] Patent Number: 5,257,097
[45] Date of Patent: Oct. 26, 1993

[54] METHOD AND APPARATUS FOR SELECTIVE INTERCEPTION OF A GRAPHICS RENDERING OPERATION FOR EFFECTING IMAGE DATA MODIFICATION

[75] Inventors: Richard A. Pineau, North Andover; Timothy K. Rodgers, Concord; Mitchell S. Allen, Billerica, all of Mass.

[73] Assignee: Eastman Kodak Company, Rochester, N.Y.

[21] Appl. No.: 767,282

[22] Filed: Sep. 27, 1991

[51] Int. Cl.⁵ .............................................. H04N 1/46
[52] U.S. Cl. .................................... 358/500; 358/527
[58] Field of Search ................................. 358/75–80

[56] References Cited

U.S. PATENT DOCUMENTS

| | | | |
|---|---|---|---|
| 4,500,919 | 2/1985 | Schreiber | 358/78 |
| 4,542,453 | 9/1985 | Patrick et al. | 364/200 |
| 4,958,220 | 9/1990 | Alessi et al. | 358/76 |
| 4,979,032 | 12/1990 | Alessi et al. | 358/80 |
| 4,992,861 | 2/1991 | D'Errico | 358/75 |
| 5,113,249 | 5/1992 | Yosefi | 358/80 |
| 5,140,413 | 8/1992 | Suzuki et al. | 358/80 |

FOREIGN PATENT DOCUMENTS

| | | |
|---|---|---|
| 0223383 | 5/1987 | European Pat. Off. . |
| 0448250 | 9/1991 | European Pat. Off. . |
| 2213674 | 8/1989 | United Kingdom . |

OTHER PUBLICATIONS

Newman, G. H. et al., U.S. Ser. No. 385,242, "A System For Performing Linear Interpolation".
Newman, G. H. et al., U.S. Ser. No. 07/590,375, "Color Image Processing System For Preparing A Composite Image Transformation Module For Performing A Plurality of Selected Image Transformations".
Newman, G. H. et al., PCT International Application No. PCT/US90/04162 published Feb. 7, 1991, "A System For Performing Linear Interpolation".
"The Latest Word," *The Seybold Report on Desktop Publishing*, Jun. 17, 1991, pp. 38–39.
Spencer, C. E. "Fast Color," *Macworld* Jan. 1991, pp. 136–143.
"Macintosh System Software 32-Bit QuickDraw", *Preliminary Developer Note,* Apple Computer, Apr. 28, 1989.
Tait, D., "TekColor Offers True Screen-to-Printer Color Fidelity" *Computer Pictures,* Feb./Mar. 1990, pp. 39–41.
Littman, D. et al., "It's a Color Calibrator and a Floor Wax," Macworld, Jul. 1991, p. 153.
Mattison, P., "Build A Speedy Low-Cost Graphics Accelerator In Hardware", *Electronic Design,* May 9, 1991, pp. 101–109.
Proceedings of the Sixth International Congress in Advances in Non Impact Printing Technologies, 21 Oct. 1990, Orlando, Fla., pp. 837–843.
T. Yamasaki, "Optimum Color Space for Color Data Exchange and Its Mutual Transformation to Other Color Spaces".
Computer and Graphics, vol. 10, No. 4, 1986, Great Britain, pp. 371–377, N. Morovac, "Architecture of Application-Oriented Systems Using Interactive Computer Graphics".
Information Display, vol. 7, No. 4 & 5, Apr. 1991, pp. 20–2049 J. Taylor et al, "Device-Independent Color Matching You Can Buy Now".

*Primary Examiner*—Stephen Brinich
*Attorney, Agent, or Firm*—Mark Z. Dudley

[57] ABSTRACT

Imaging system whereby color image data intended for reproduction on an image reproduction means may be provided to a functional engine for modification according to one or more functional transforms. Color management may be applied to the data before output to the selected image reproduction device, so as to achieve WYSIWYG color matching of the image data with respect to the color fidelity limitations or other characteristics of the intended image reproduction device.

13 Claims, 8 Drawing Sheets

METHOD AND APPARATUS FOR SELECTIVE INTERCEPTION OF A GRAPHICS RENDERING OPERATION FOR EFFECTING IMAGE DATA MODIFICATION

BACKGROUND OF THE INVENTION

The present invention relates generally to color image processing systems. More particularly, the invention relates to digital color imaging systems providing matching hard and soft copy image reproductions according to the color accuracy or other image quality characteristics of the particular reproduction apparatus used.

Color Image Processing Systems

Color image processing systems have been described in the art that permit an operator to manipulate an original image before forming a reproduction of the manipulated image. Color image processing systems typically include an input device for generating an electronic representation of an original color image. The input device provides the electronic image representation to a computer workstation which processes the image in accordance with a user's instructions and forwards the processed image to a high-resolution color monitor for display. The user can then save the desired processed image in a data storage means, transfer the desired image to other image handling devices via a communications network, or generate a hard copy of the desired image by instructing the workstation to provide the processed electronic image to a selected output device such as a color hard copy printer.

For example, U.S. Pat. No. 4,500,919 entitled "COLOR REPRODUCTION SYSTEM", issued in the name of W. F. Schreiber, discloses an image reproduction system of one type in which an electronic reader scans an original color image, which may be in the form of a transparency or a print, and converts it to an electronic image. A computer workstation and an interactive operator interface, including a video display, permits an operator to edit the image displayed. When the operator has composed a desired image on the video display, the workstation causes an output writer device to make an inked output that is intended to match the reproduced image composed on the video display.

Recent improvements in the spatial and data resolution capabilities of desktop digital color imaging systems (also known as graphics workstations) have provided color image processing systems that can implement image manipulations based on advanced image processing algorithms. The user may thereby effect more extensive image manipulation schemes such as windowing, zooming, cropping, and superposition, and further allows the user to create or add wholly new images by the use of drawing algorithms. In such workstations, the color signals are processed in digital form by applications software that offers unprecedented accuracy, speed, and flexibility. Some of these image manipulation algorithms have been implemented in commercially-available software for image creation, editing, and manipulation, such as Adobe Photoshop (Adobe Systems Incorporated) and ColorStudio (Letraset).

The electronic image to be processed by the graphics workstation consists of a two dimensional array of picture elements, or "pixels". The color of each pixel may be represented in any of a variety of color notations, or "color spaces". For example, the RGB color space represents pixel colors according to the relative contributions of three primary colors, red, green and blue. This color notation is commonly used by color display devices such as color monitors because the RGB parameters correspond to the mechanism by which the monitor generates color. More specifically, each pixel of the monitor's display contains three primary color phosphors. To generate a color defined by a set of RGB values, the monitor stimulates each primary phosphor with an intensity determined by the corresponding R, G, B value.

Similarly, the CMYK color space represents color using four variables corresponding to the relative (subtractive) contribution of the colorants cyan, magenta, yellow and black. This notation is commonly used by printing devices because each parameter determines the amount of a respective colorant (e.g. ink or dye) used by the printer in producing a desired color.

Figure 1:
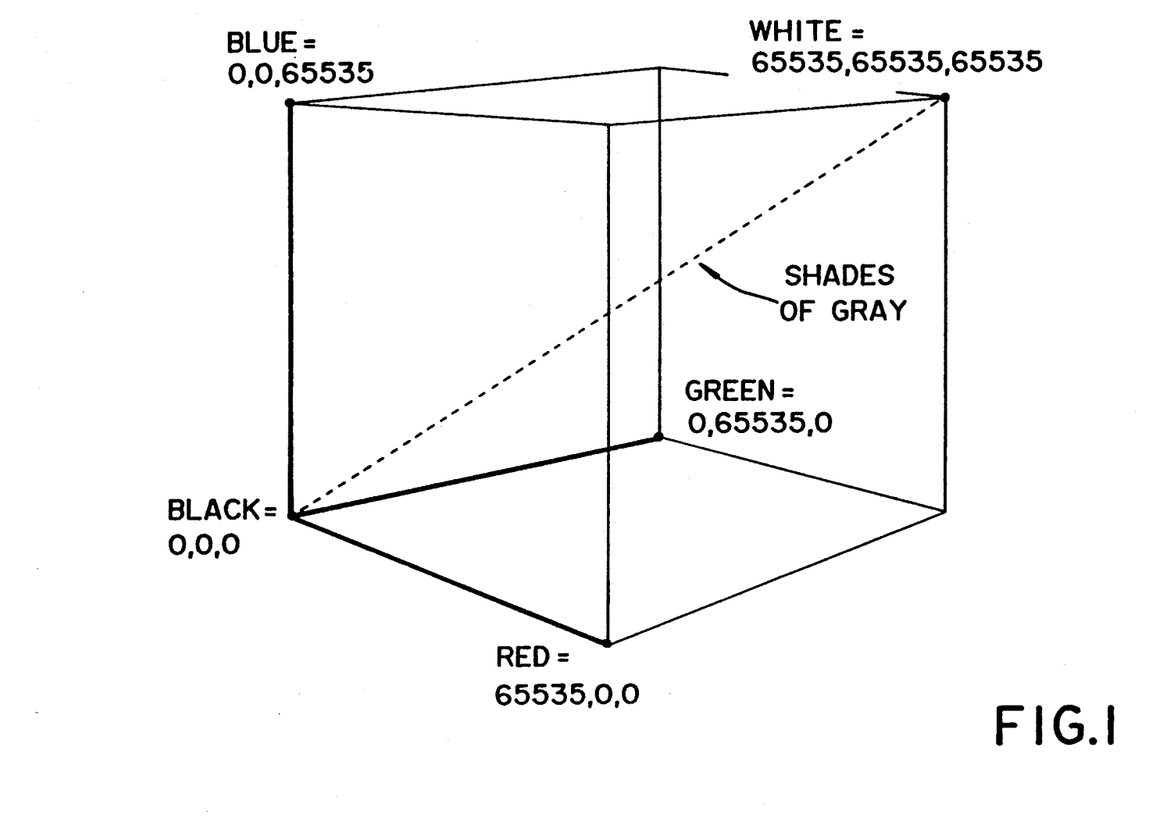
FIG. 1 is a diagrammatic representation of RGB color space.

Color spaces based on linear RGB and CMYK parameters are useful for image scanning devices and image printing devices, respectively, since each parameter of the color space closely corresponds to a physical mechanism by which these devices measure and generate color. However, for a variety of reasons, these color spaces may not be well-suited for processing color images. For example, as shown in FIG. 1, the RGB color parameters define a three dimensional, linear color space wherein each point corresponds to a unique color. At various points within the space, a selected change in the value of a parameter may not result in a commensurate change in the perceived color. At one location in the space, increasing the parameter R by n units yields little perceived change in color; at another point in the space, increasing R by the same n units yields a dramatic change in the perceived color. Accordingly, it may be difficult for a user to manipulate the primaries R, G, B, to achieve a desired change in color.

In response to this problem, a variety of perceptually-based color spaces have been proposed for defining color in terms of parameters that more closely correspond to the manner in which humans perceive color. Such coordinate systems are known as the Munsell standard for value, hue, and chroma; or the 1976 Commission Internationale de L'Eclairage (CIE) color spaces CIELAB (L*a*b*) and CIELUV (L*u*v*); etc.

Color Fidelity In The Imaging Chain

Figure 2:
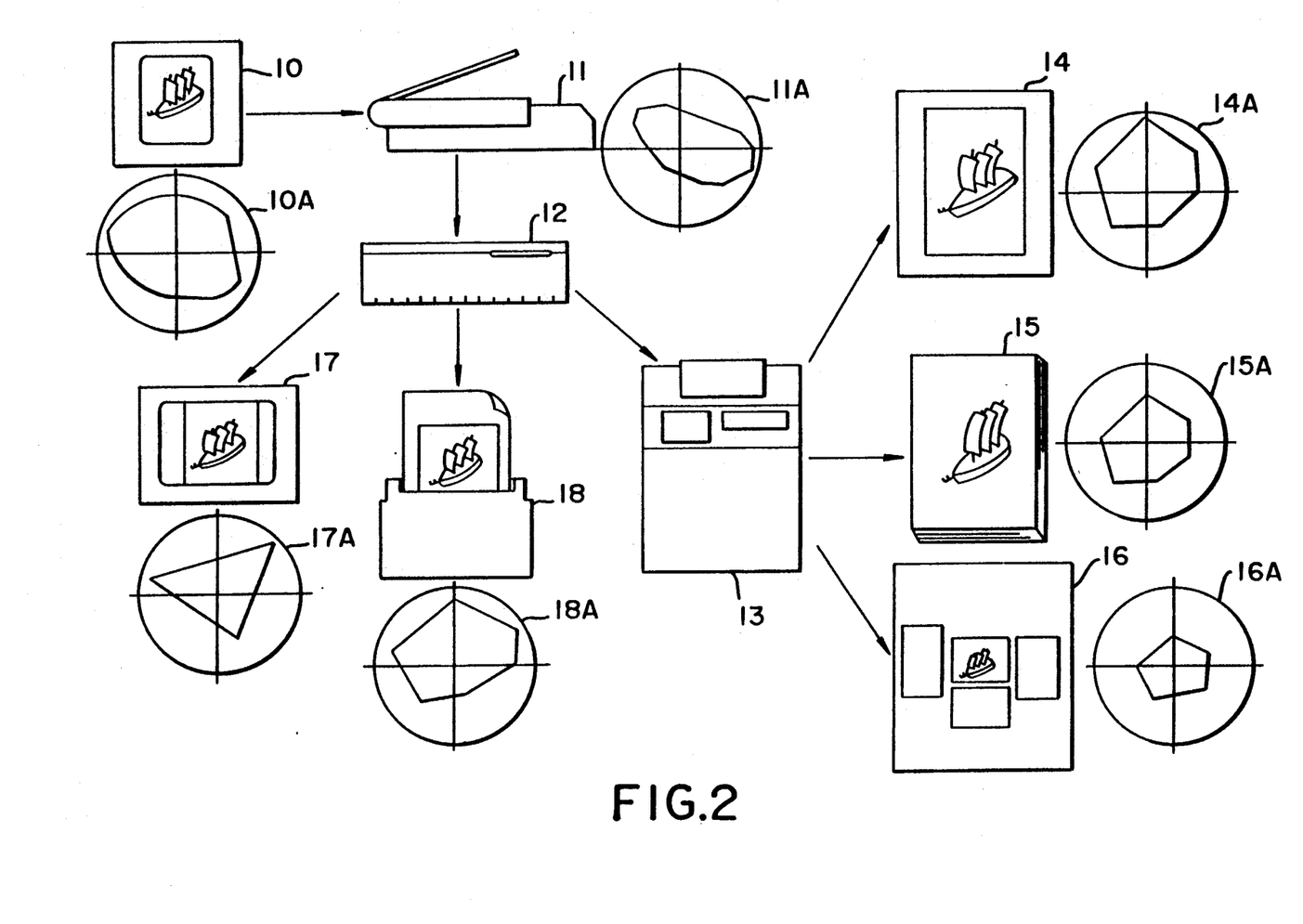
FIG. 2 is a diagrammatic representation of a conventional color imaging process according to the prior art.

As illustrated in FIG. 2, there is nonetheless a substantial loss in color fidelity in the typical image processing system wherein an original image on a color photo or negative 10 is scanned by a scanner 11 and processed by an image processing unit 12 before being translated by an imagesetter 13 into an image for hard copy reproduction on a color print 14, magazine cover 15, or newspaper or tabloid page 16. Illustrated also are images provided by a color display monitor 17 and a desktop color printer 18. Schematic representations of the original image color gamut 10A in CIE standard color space, and of the CIE color gamuts of the intermediate images 17A, 18A, and final images 14A, 15A, and 16A illustrate the loss of color gamut as the image is handled by the various devices.

The original image 10 has a large color gamut indicated by the color space representation 10A due to the combination of the dyes and sensitivity of the photographic film used to capture the image. The original image has a quality that may be characterized as bright, realistic, and saturated. The color gamut of the intermediate images is less and, in some portions of the color space, distorted. When the image is output from the imagesetter, which outputs separation masters for printing the final image prints 14, 15, 16, the color gamut of the original image 10 has changed substantially.

Monitoring of the image is especially important before the processed image is committed to another image handling means in the system, such as the color printer 18, imagesetter 13, or an image data transmission or storage device (not shown). In most applications, an accurate "preview" or "soft copy" version of the processed image *as it will appear on another image reproduction device* is necessary on the display 17 in real time during the image manipulation process. In some applications, such as in color pre-press image proofing, a discrepancy between the hard and soft copy reproductions will lead to production errors that are expensive and time consuming to correct. Also, in desktop publishing, an image processing system that offers an accurate preview of the processed color image has great practical and commercial advantages.

Hence, a desired digital color imaging system would preferably offer identical soft and hard copy reproductions of a given image, regardless of the means on which any one reproduction is formed. Alternatively, if identical reproductions are not feasible, the reproductions would be visually matched (i.e., made identical to the eye) in a predictable and selectable fashion. That is, the color gamut of the image provided by a first reproduction means would be selectably matched to the image quality limitations of secondary or tertiary image reproduction means that may offer reproductions of lesser color fidelity. The user is then able to assess the relative quality of any potential image reproduction. The common acronym for matched image reproductions is "WYSIWYG" (what you see is what you get). However, as shown in FIG. 2, what one sees on a display monitor 17 in a color imaging system has heretofore not been the image produced by the hard copy printer 18. Scanners, monitors, and printers can digitize, display, and print millions of colors, but the color reproduced at each stage is different because the color gamut and fidelity of the image reproduction is very much "device-dependant".

Another complication in achieving WYSIWYG color matching occurs when the color imaging system is capable of forming a soft copy reproduction on any one of a variety of display devices, and when the hard copy image may be produced by any one of variety of hard copy output devices onto different types of image-receptive output media. WYSIWYG color matching is difficult to achieve because each output device and/or medium has unique color reproduction properties. In addition, the intended viewing environments for the hard copy reproductions may differ, depending on the hard copy medium chosen, and thus the hard copy versions are often distinguishable from one another.

Color Accuracy In Display Monitors

Still another complication arises because color accuracy in the typical color monitor is affected by several factors, including ambient light, phosphor temperature, and the accuracy of the electron guns. Soft and hard copy images often fail to match because the phosphor spectral characteristics and other properties of the display differ from the characteristics of the image colorants used in the hard copy output devices or image-receptive materials.

Another complication is that the image-bearing RGB signals that drive the color monitor will differ from the CMYK or RGB signals required to drive some hard copy output devices. Each output imaging device may require a particular alteration of color signals in order to account for differences in the color sensitivity of a particular output device. For example, with a color image reproduction system that employs a film writer as an output device, the RGB color signals that drive the monitor display are not the same as the RGB signals required to drive the film writer to produce a matching image. Although a display monitor equipped with a 24-bit video display card can display almost any color the eye can see, the monitor typically fails to display an image with the same hues, saturation, and brightness that will be seen on hard copy. For example, a monitor's "white" depends on the temperature of its phosphor; the resulting color cast in turn affects the display of every other color.

Therefore, one prerequisite to accomplishing WYSIWYG color on desktop color workstations Apple is to ensure that the monitor displays consistently accurate colors. Examples of color calibration of the Macintosh (Apple Computer, Cupertino, Calif.) display monitor (with the presumption that images output therefrom will better match a hard copy image) are provided in the CorrectColor Calibrator (RasterOps, Santa Clara, Calif.) and the Radius PrecisionColor Calibrator (Radius, Inc., San Jose, Calif.).

The RasterOps device is said to calibrate 24-bit color monitor displays, printers, and scanners. The RasterOps calibrator uses four optical sensing devices in a suction cup that attaches to a monitor. Three of the optical sensors measure RGB, and the fourth measures white light. The sensing device, together with its base unit (called the Color Integration Processor) and various standard attachments, may be used as a densitometer for measuring colors on film, as a colorimeter for calibrating a monitor and measuring colors on paper, or as a luminance-measuring device that is intended to set the color temperature of certain monitors.

However, to set the base color temperature of a monitor, the calibrator must be programmed with the size and precise refresh rate of the monitor so that it can synchronize with the monitor's scanning beam. Currently, the CorrectColor Calibrator looks for identification in the monitor's read only memory (ROM) and then looks up the monitor's refresh rate in a table kept in the calibrator. This necessary information is retained only for monitors available from certain manufacturers, such as those from RasterOps, Apple Computer (Cupertino, Calif.), and Sun Microsystems, Inc. (Mountain View, Calif.). Further, to set the color temperature of a display, the user must place the sensing device over a white rectangle on the monitor screen. The software makes a contour map of the screen, so as to change the monitor's gamma tables. A total of 49 rectangles appear in a 7 by 7 grid, and thus 49 measurements are necessary. To calibrate a scanner, the user must place a reference image in the scanner and the calibrator software displays the scanned image next to a display of a disk-stored copy of the same image. Differences between the two images tell the calibrator how to calibrate the scanner.

The Radius PrecisionColor Calibrator uses a combination of proprietary software and an optical sensor that attaches to the ADB (Apple Desktop Bus). A sensor clamps onto the screen with a suction cup and reads the red, green, and blue intensity levels. The software then analyzes the monitor's response to output from the video card. If the monitor doesn't show the desired contrast and brightness, the output of the monitor display card is adjusted until the monitor shows the desired results. This system attempts to calibrate one Radius monitor so as have the same response as all other calibrated Radius monitors. It also provides several settings for different scanners and printers, and allows one to adjust the color temperature, or the monitor's whiteness.

Other monitor calibration systems, such as the Barco calibrated monitor commercially available from RasterOps, may also use an intensity sensor and offer color-temperature adjustments. The calibration feedback is directed to a processing system within the monitor. Data from the optical sensor is used to maintain consistent response levels from the phosphors, a technique that ostensibly ensures the stability of the monitor color for longer periods by correcting for amplifier drift, aging phosphors, and environmental changes. However, because the feedback is not provided to the video card, the drive signals from the card to the monitor can exhibit noticeable color inaccuracy.

Therefore, calibration systems, such as the aforementioned Radius and RasterOps systems, are but a partial solution to the WYSIWYG color matching problem. Such systems are time consuming to implement and require substantial user intervention. They are not suited to automation and must be implemented on a periodic basis, such as once a day, so that variations in the monitor's reliability and color accuracy can be corrected with the least expenditure of of time and effort.

Another color calibration approach is exemplified by the TekColor color calibration apparatus implemented in apparatus offered by SuperMac Technology, Sunnyvale Calif. and developed in partnership with Tektronix, Inc. (Corvallis, Oreg.). The Tektronix TekColor Picker, a replacement for the Macintosh Color Picker, is based on a CIE-derived objective color space that attempts to accurately match monitor and printer colors.

The TekColor approach assumes that the monitor may be calibrated to provide consistent colors in the displayed images. However, because a backlit monitor displays colors differently than does the printed page (wherein the colors are the result of light reflected from the page), the TekColor approach is said to address the requirement that a monitor's color values be precisely translated to to those of the desired output device, such as a desktop color printer. That is, typical backlit monitors use an additive red, green, and blue (RGB) system to create a displayed image. Most hard copy output devices use a subtractive system, wherein various mixtures of cyan, magenta, yellow, and black (CMYK) dyes subtract colors from the light spectrum that is reflected from the hard copy to the human eye.

Because of the difference between additive and subtractive color, there are colors reproducible by a monitor that cannot be printed by the typical printer, and a few colors reproducible by a printer but not a monitor. For example, the typical Macintosh graphics imaging application employs an RGB model to display colors and a corresponding CMYK model to print colors, but when the color values are actually assigned for display or printing, the RGB and CMYK values are actually more generalized. A specific monitor or printer may seem to be capable of displaying and printing all RGB and CMYK values, but such ranges are not realized in practice. (The issue is complicated by wide use of the Pantone color-matching system for predictable spot-color output.) This becomes obvious when RGB and CMYK models and the gamuts of particular output devices are mapped against the CIE color model.

In the TekColor scheme, the color gamuts for several monitors are determined and then matched to the gamuts of specific output devices, such as the Apple, Radius, and RasterOps monitors and the Tektronix Color-Quick color printer. Instruments calibrated to CIE specifications are assumed to accurately and consistently report the CIE coordinates for any color. A version of the CIE standard (known as TekHVC, created by Tektronix) is used as an objective color model, so that by mapping the gamuts of monitors and printers to TekHVC, TekColor attempts to provide true WYSIWYG color.

In practice, however, a color imaging system that employs the TekColor system must access predetermined tables that can only map the full color gamut of one given monitor and printer combination. Further, TekColor is packaged as a Macintosh control device (cdev) that replaces the Apple Color Picker. The user must therefore manually choose colors to display from a dialog box that shows the gamuts of both the monitor and the printer as two triangular, overlapping leaves; the respective devices can reproduce only the overlapping colors.

For these and other reasons, the above-described attempts at achieving WYSIWYG color matching are difficult, cumbersome, and time-consuming. Calibration of input and output devices, as described hereinabove and as known in the art, are an incomplete solution to the task of achieving true WYSIWYG color. Color space transformation for color correction To achieve color fidelity in modern desktop color imaging, the color imaging system is required to receive, manipulate, and output color signals that are represented in a variety of color space coordinate systems. At present, color signals are specified in color value standards that differ according to the device manufacturer. Colors from the Apple Macintosh, for example, are specified for display in values that differ from monitor to monitor and from printer to printer.

Those skilled in the art now recognize that the color values of disparate images must be specified in an objective, device-independent way. Some artisans have advocated color correction whereby color signals are stored in a device-independant coordinate system such that a color image reproduction systems may then process the image through a digital intermediary such that not only the image content but also color matching, by implementing color space transformations, may be achieved. The image processing system typically contains a predetermined transform definition for each requisite color image transformation. For example, U.S. Pat. No. 4,346,402 teaches that color correction can be carried out by means of a digitally-operated lookup table (LUT) for transforming color coordinate values from one color space to another color space.

Accordingly, the color at each pixel of an electronic image is sequentially mapped in accordance with the transform definition to yield the desired visual effect. However, to perform another image transformation, the system remaps the color values to yet another point in accordance with a second transform definition. Any number of transformations can be performed by sequentially mapping color values according to the available predetermined transform definitions. However, sequential processing of images can be extremely time consuming, particularly if a large number of predetermined transforms are selected. In a computational sense, color management of a given image requires the definition of multiple complicated functions in their respective color spaces (device dependent and independent) and the ability to transform or to map a set of color imaging data between one color space and a corresponding set of imaging data in one or more other color spaces. This color correction is effective but difficult to implement, and computationally-expensive because the various color spaces systems are related as complicated, non-linear transformations between multiple variables that in some cases are not all independent of one another.

Color space transformation methods are disclosed in commonly-assigned U.S. Pat. Nos. 4,958,220 and 4,979,032 respectively issued Sept. 18, 1990 and Dec. 18, 1990 in the names of P. Alessi et all., the disclosures of which are included herein by reference. Alessi et all. disclose apparatus for producing a hard copy reproduction which visually matches a particular video image display, wherein the reproduction may be made on any of a plurality of image-receptive materials. The disclosed apparatus enables an operator to preview a reproduced color image and then to write a visually matched copy of the previewed image onto one of a variety of different types of image-receptive output media. Computer-controlled means adjusts an image-bearing signal to an output film writer in accordance with the color reproduction properties of the particular output medium. The computer means also serves to transform imaging data in database color space terms to red-green-blue (RGB) terms in color spaces related, respectively, to the video monitor and to the output film writer.

Accordingly, it is desirable that color space transformations (and other image data transformation or manipulation functions) be implemented in a color imaging system in a simpler, more effective fashion.

SUMMARY OF THE INVENTION

In the contemplated color imaging system, image data that has been processed by graphics application software for desktop publishing, computer-aided design or manufacturing (CAD/CAM), video production, multimedia, etc., may be prepared for viewing as a preview image by a graphics rendering operation. Upon the invocation of one of the graphics rendering routines, the invocation is selectively intercepted. Image data is subject to a functional transform engine wherein the data is modified according to one or more image data transforms. In the preferred embodiment, certain types or portions of the image data that conform to certain criteria are selected for modification. Other, non-conforming image data are not subjected to modification. The modified and unmodified image data are provided to the graphics rendering routine for display thereafter on a soft copy image reproduction device.

The preferred image data modification may be achieved on a desktop color imaging workstation in real time and in a manner transparent to the user and to the executing graphics application software. In the preferred embodiment, the functional transform engine modifies of the image data according to a color management system based on color space transforms. The preferred color management may be implemented optionally by an image data acceleration processor, for enhanced speed and greater versatility.

An operator of the contemplated color imaging system may preview a color image reproduced in soft copy (displayed) form before outputting a visually-matched hard copy version of the displayed image onto any of a variety of different types of image-receptive output media. The displayed image will match the output image ultimately produced by a selected hard copy image reproduction means, whether such means is in the form of a photographic, electrophotographic, imagesetting, thermal dye transfer, ink jet, or other apparatus. Color management is effected automatically without adjustment to the graphics application, the color management system, or the image reproduction apparatus.

The preferred color space transforms are based on, but not limited to, the particular characteristics and color gamut limitations of the image data source, the hard and soft copy image reproduction means, and the capture mediums used to reproduce the image data. The contemplated color imaging system thus has the ability to produce accurately-rendered reproductions of digitized images using any of a plurality of image-receptive media or devices. An image originally captured on negative film, for instance, may be provided as matching reproductions on a color monitor as well as on negative or positive photographic films or papers.

The foregoing advantages, as well as other advantages of the invention, will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF PREFERRED EMBODIMENTS

It is contemplated that several embodiments of the invention will find great utility in a variety of color imaging systems. The preferred embodiment has been conceived for implementation in a desktop digital color imaging system that includes a Macintosh II computer commercially available from Apple Computer, Cupertino, Calif. However, an implementation of a color management system constructed according to our invention need not be limited to only one such application, as other digital color imaging environments will benefit from the invention. For instance, the method to be described below may be implemented by one skilled in the art for use in graphics systems based on, for example, applications software such as Microsoft Windows (Microsoft Corp., Belleview, Wash.), on workstations such as the Sun Microsystems SunView, (Sun Microsystems Inc., Mountain View, Calif.), and with respect to graphics applications standards such as Motif (Open Software Foundation), and Open Look (Sun Microsystems, Inc.).

Preferred Image Data System

Figure 3A:
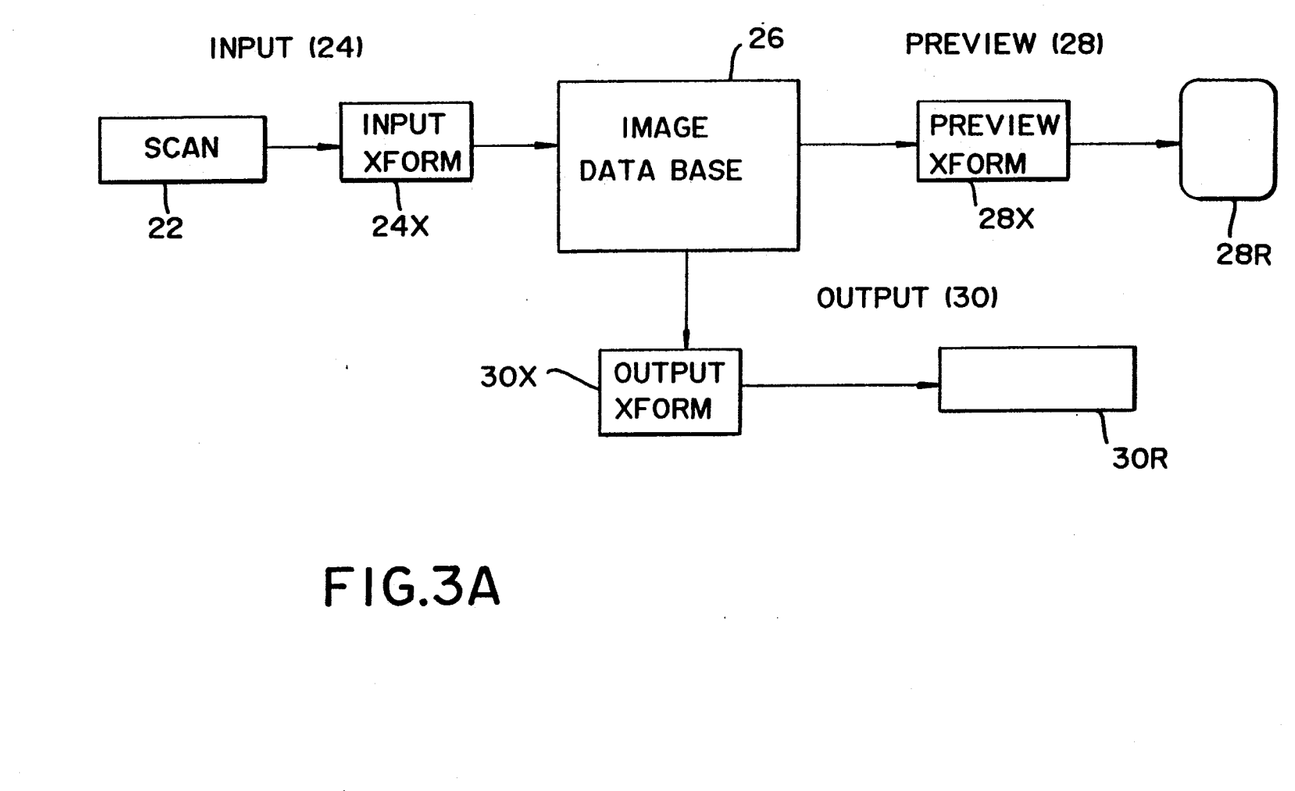
FIG. 3A is a schematic representation of a color image processing and reproduction system that is implemented according to the present invention.

FIG. 3A shows, in block diagram form, a preferred implementation of color image processing and reproduction system 20 in accordance with the invention. The imaging system 20 is preferably capable of graphics image processing whereby an operator may acquire an original image by use of an image source means 22 and apply one or more input transforms 24X to the image data to format the image data for inclusion in a reference image data base 26. Image data then present in the reference image data base 26 may then be subjected to conventional image processing steps such as are known in the art of electronic image editing. In a preferred embodiment described below, the contemplated image editing includes known methods for altering or supplementing the color and composition of the original image by use of third party graphics application software. However, such editing step is not limited as such and may include image decomposition, analysis, and other known image processing techniques, depending on the application.

The acquired color image is thus realized in the form of electronic signals herein referred to as original image data; the original image data (after being subjected to input transforms 24X and one or more editing functions) becomes edited image data in the image data base 26.

The operator may then effect image reproductions by directing edited image data along preview 28 and 30 output paths for the production of soft (preview) or hard copy image reproductions 28R, 30R, respectively. The previewed image is thus preferably a displayed version of the edited image that would ultimately be realized on the hard copy reproduction.

The present invention is in particular directed to the preview step 28 whereby the edited image data is directed from the image data base 26 to at least one preview transform 28X resident in an installed functional transform set, to provide modified edited image data for use in rendering or generation, of the preview image on a display unit 28R.

Figure 3B:
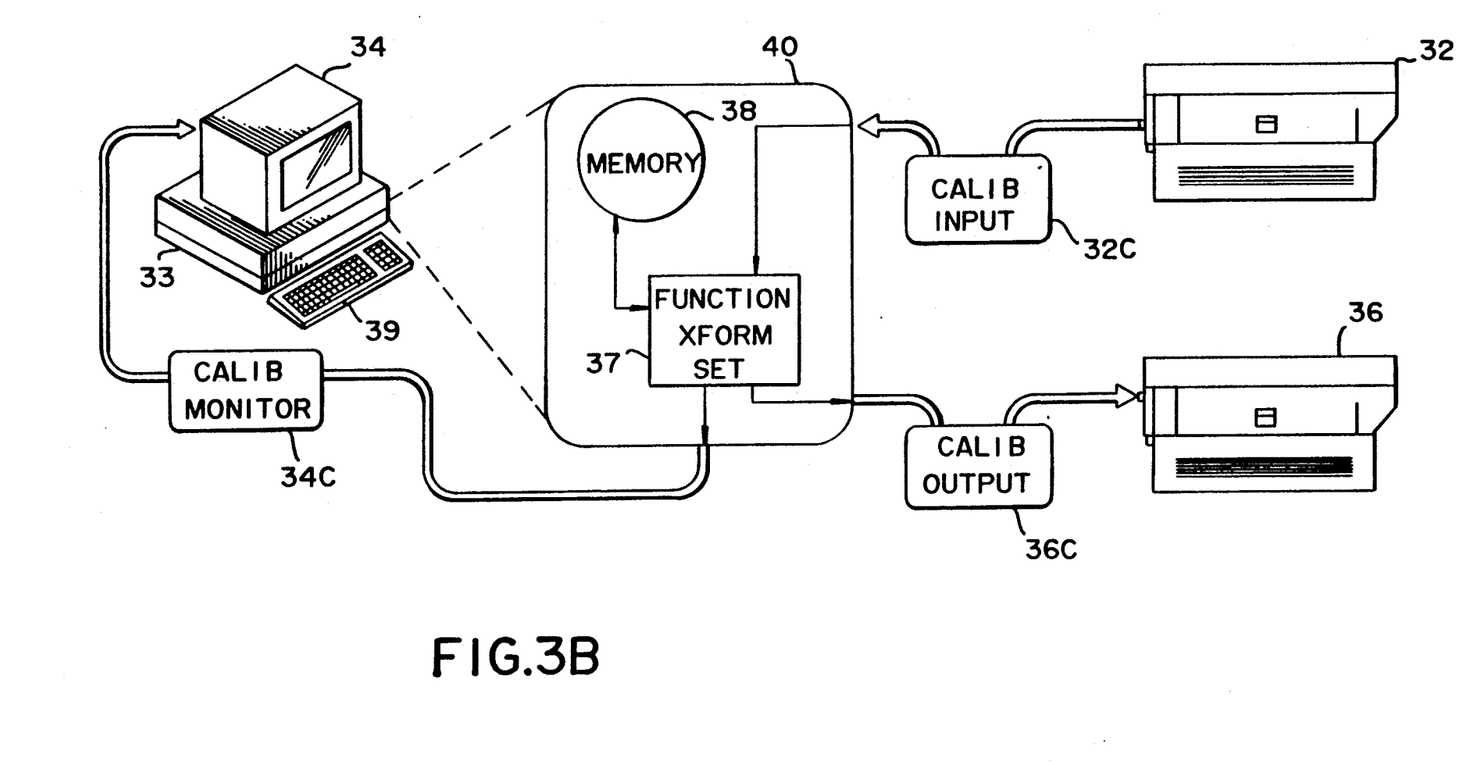
FIGS. 3B and 3C are schematic representations of a desktop digital color imaging system constructed in accordance with a preferred embodiment of the invention.

Hence, with reference to FIG. 3B and the following drawings, it will now be shown that that by selective interception of the image rendering process in the preview step 28, the perceptible color-content of a preview color image reproduction, which heretofore varied from a hard copy reproduction of the same image, may be matched to the hard copy version.

First, the preparation of the image data prior to the preview step should be understood. Several processes precede the editing and preview of a given image. According to known calibration techniques (cf. Background of the Invention), the image source, such as a scanner 32, is calibrated by use of a calibration means 32C. Similarly, the display hardware 34 are calibrated by respective calibration means 34C, and the hard copy output means such as a thermal color printer 36 is calibrated by a respective calibration means 36C.

For example, display calibration means 34C may be used to correct: data transmission errors or variations occurring to date conveyed between the workstation 33 and monitor 34; the accuracy of a CRT display monitor circuitry that controls the electron beam scanning of the phosphor layer; the color accuracy of the phosphors used; ambient lighting condition for the particular work environment; and white point and gamma settings.

Monitor setup and color calibration is expected to be performed on site by the user. Common setup procedures consist of placing a colorimeter puck on the monitor and running a program which displays a series of targets which allow appropriate calibration software to adjust, for example, white point and color balance.

Another process to be carried out is the introduction of information to the workstation 33 via the control apparatus 39 to define the image acquisition environment, the preview environment, and the hard copy output environment, using interactive menu selections in a fashion known in the art. In doing so, the particular media and/or image reproduction means that will ultimately be used to provide the desired image reproductions are inputted to the workstation 33. The operator may, for example, input certain specifications and/or operational parameters provided by the manufacturers of the scanner 32, display 34, and printer 36, along with information on, for instance, the thermal dyes or paper substrate used in the printer 36.

An image processing system 40 within the workstation 33 includes control algorithms that preselect appropriate transforms from a functional transform set 37 such that the original image acquired by the scanner 32 in, for example, RGB format that is translated according to one or more preselected input transforms. The original image data is translated to conform with the reference color space, and then stored in memory 38. The image data may then be edited and composed, as described hereinabove, for display on the color monitor 34.

To provide a preview image on the monitor 34, image data in reference color space format from memory 38 is translated by one or more preselected preview transforms into, for example, R'G'B' format for display on the monitor 34. By composing, then viewing the preview image on the color monitor 34, the user is able to determine whether the preview image (which may be expected to conform to the a hard copy version) is ready for reproduction in a hard copy format. If so, the user operates the control apparatus 39 to apply output transforms preselected from the functional transform set 37 to provide modified color image data in the appropriate hard copy output format, such as another modified red-green-blue (R"G"B") or cyan-magenta-yellow-black (CMYK) format for driving printer 36.

In accordance with the invention, the color imaging system 31 serves to form a hard copy of the reproduced image, on whichever output media that was indicated in the hard copy environment. Since any hard copy of a given image is visually matched to the soft copy proof, multiple hard copies of the same image on respectively different media will also be visually matched to each other.

Figure 3C:
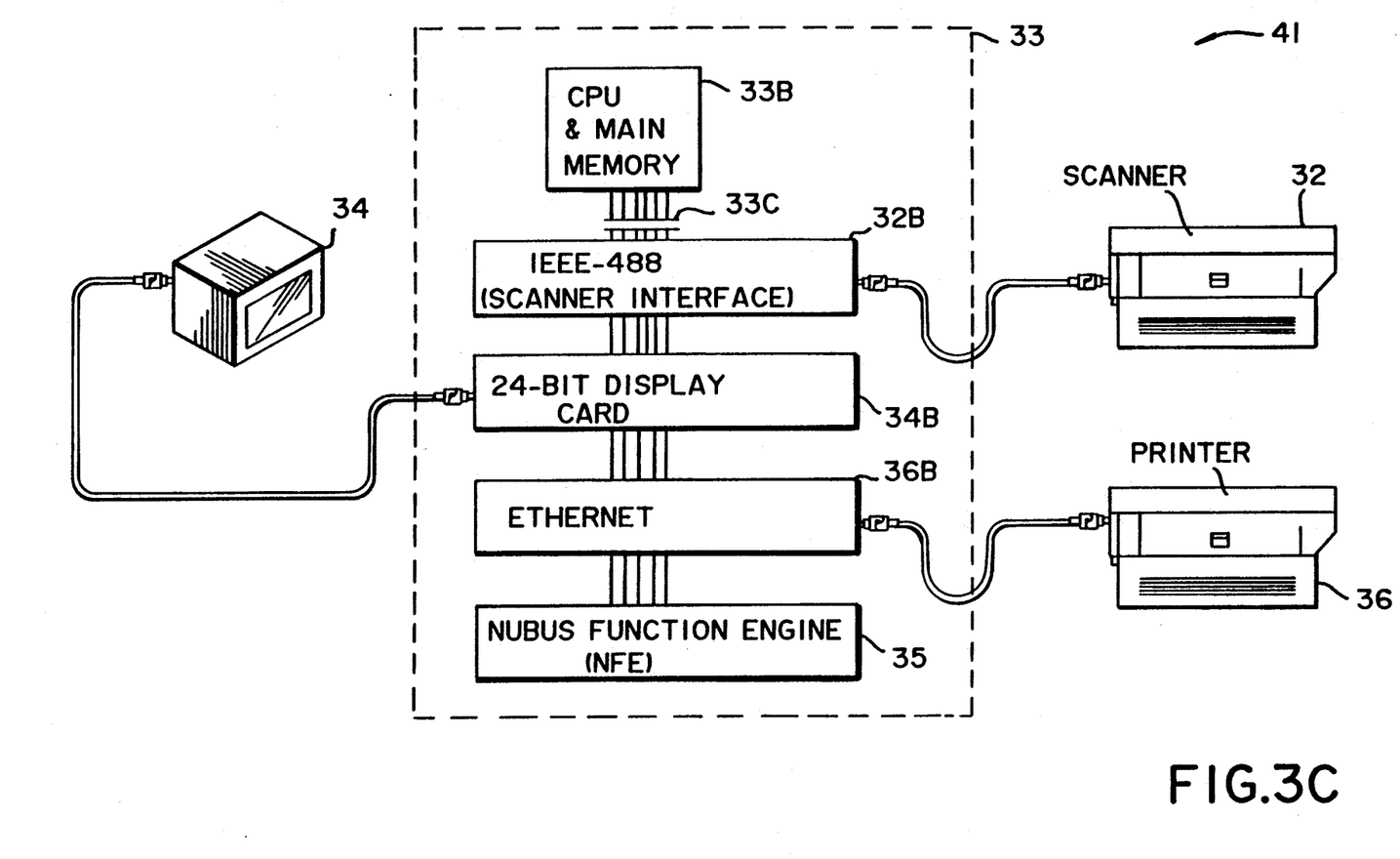

With reference now to FIG. 3C, a preferred desktop color imaging system 41 features an original image data source in the form of an image acquisition means, such as a desktop flatbed input scanner 32; a desktop color workstation 33; a preview or soft copy image reproduction means in the form of a cathode ray tube color monitor 34; and a hard copy image reproduction means in the form of a desktop color thermal printer 36. The scanner 32 allows an operator to scan an original image on (for example) a photographic input film so as to produce red (R), green (G), and blue (B) image-bearing signals in digital form.

The workstation 33, which receives the original image data signals from the scanner 32 at an interface board 32B, includes a microprocessor-based central processing unit (CPU) and main memory board 33B for managing system functions and for effecting control and implementation of the image processing and other functions described herein. The CPU and main memory board 33B may include other components to provide other functions as known in the art, depending upon the system application and other considerations known to the skilled artisan. Workstation 33 may include or interface with other components not shown but which are known in the art, such as: magnetic or optical disk data storage apparatus; control apparatus (39 in FIG. 3B), including a keyboard and a cursor control device such as a mouse that enables the operator to access or retrieve applications software as well as image data, and to provide image manipulation commands pertinent to modifying the image to be reproduced; desktop data bus transceiver means offering serial and parallel data ports and the like; coprocessor means; etc.

The illustrated image data source 32 may, for example, take the form of an optically-based desktop image data storage and retrieval device, such as a compact disk read only memory (CD-ROM) or the PhotoCD image retrieval system commercially available from Eastman Kodak Company. Other alternative image data sources include another color imaging workstation 33, or a color data transceiver operatively connected to a high speed data transmission network, such as a broadband integrated services data network (B-ISDN) or a network operating according to the fiber distributed data interface (FDDI).

Scanner 32 may be preferably arranged to be optically coupled with an original image-bearing member such as a photographic print or 35 mm color film strip. The scanner 22 may then digitize an image from a negative film, such as KODAK VERICOLOR III Film manufactured by Eastman Kodak Company, or a reversal film, such as KODAK EKTACHROME Film or KODACHROME Film. The scanner 32 preferably employs a high resolution opto-electronic sensor, the output of which is coupled to the interface board 32B. Suitable scanners include the commercially-available Eikonix Model 1435 high resolution scanner, having a very high resolution sensor pixel array (a 3072×2048 pixel matrix) capable of generating high spatial density-representative output signals which, when converted into digital format, yield digitized photographic image files from which high quality color displays and prints may be obtained.

The digitally-encoded original image data is preferably supplied in the form of an pixel-array-representative bit map, resolved to a prescribed code width (e.g. eight bits per color per pixel). The high-resolution digitized image file may be provided in in a multiresolution, hierarchical format. The use of a muitiresolution storage format facilitates a preview display of images via reproduction by a variety of devices, the resolution of which may vary from device to device. One example of a color photo-finishing system that takes advantage of this capability is disclosed in co-pending patent application Ser. No. 582,305, filed Aug. 27, 1990, by S. Kristy entitled "Multiresolution Digital Imagery Photo-finishing Systems," assigned to the assignee of the present application and the disclosure of which is herein incorporated.

Workstation 33 preferably includes a functional transform engine 35 operatively connected to the CPU 33B and other workstation components via an internal bus connection 33C (e.g., NuBus). The functional transform engine optionally includes a hardware accelerator which allows the rapid evaluation of the transforms already described with reference to the functional transform set 37 of FIG. 3B. In a preferred embodiment, the hardware accelerator allows the functional transform engine to achieve upwards of 20M operations per second, such that it can perform all necessary input, output, and preview color transformations.

The functional transform engine accesses selected images from an image memory means situated thereon by means of direct memory access (DMA) block move techniques. The image memory will contain all images being actively processed by the graphics application. The size of the image memory as well as the type of image memory will determine the performance of the application. Further details of the functional transform engine operation will be described below with reference to FIG. 5 et seq.

Display 34 preferably is in the form of a cathode-ray tube (CRT) color monitor driven by a 24-bit display card 34B which includes a digital image frame store and digital to analog (D/A) converters. The display card is preferably in the form of of a standard 24 bit color board with a minimum of 1024×768 pixel viewing area. The monitor 34 displays a soft copy version of the processed image, corresponding to R'G'B' color-managed image data signals derived from the functional transform engine 35.

The workstation 33 is further capable of delivering color-managed image data signals to one or more hard copy output devices 36 for forming a hard copy version of the soft copy image reproduction. The contemplated thermal printer 367 is driven by respective color page printer drivers in the interface board 36B, which drive one or more page-description languages (PDL)—the software that formats a page of information to be processed by the printer's "engine", or printing element. Adobe PostScript is one desktop PDL standard, producing high-quality text, graphics, and images. The combination of the PDL software in the printer's read only memory (ROM) and the printer's hardware processor is referred to as the RIP (raster-image processor).

The hard copy output device 36 may alternatively be a film writer which, in response to the workstation 33 supplying R"G"B" color-managed image data signal, writes a color-managed image onto an output film of either the reversal type or of the negative type. KODAK VERICOLOR III Film serves as a suitable negative film and KODAK EKTACHROME 100 Film as a reversal film. In still another alternative, the edited image data or color-managed image data may be transferred from another output port on the interface board 36B to other color imaging systems such as another workstation 33, or to means such as an image data storage means or a data communications means for transferring the image data over a color data transmission line.

The operator may interact with the workstation 33 to provide image-manipulation commands to edit a single image or combine two or more images into a single composite image. It is contemplated therefore that the CPU and main memory board 33B is adapted for processing such commands according to image editing and image composition software generally known as graphics application software. Commercial examples of graphics application software are Photoshop (Adobe Systems Incorporated), ColorStudio (Letraset), and other electronic retouching and/or photocomposition software. The following operator-controlled functions are exemplary but not limiting: CROP—eliminates unwanted portions of image edges; REPLICATE—repetition of selected portions; SIZE CHANGE—magnifies image size by a specified factor; MASK—defines "regions of interest" by boundary specifications; CUT—extract a selected image portion; PASTE—combine one image with another; COLOR BALANCE—change overall image color; CONTRAST—manipulate contrast curves; HUE/CHROMA/LIGHTNESS—independent control of color quantities; and SIMULATE IMAGING MEDIA—emulate appearance of edited image if output to various image receptive materials.

Graphics Display Section

Figure 4:
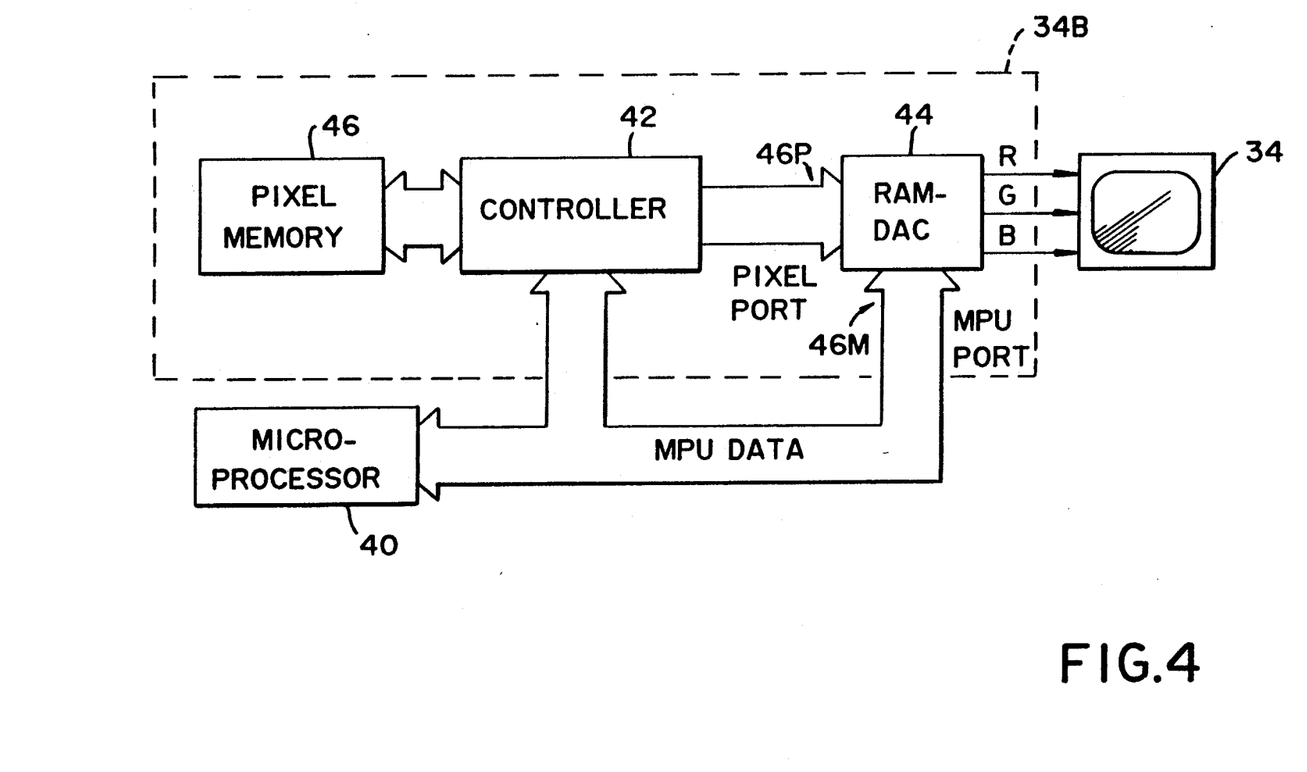
FIG. 4 is a block diagram of the graphics display section in the color imaging system of FIG. 3C.

As shown in FIG. 4, the preferred video-based 24-bit color display board 34B operates with a microprocessor unit MPU 40 on the CPU and main memory board 33B (cf. FIG. 3B) to effect a soft copy reproduction of the desired image on the cathode ray tube color monitor 34. Display board 34B includes graphics controller 42; a random access memory, digital to analog converter (RAM-DAC) section 44; and a pixel memory 46 which serves to retain the image in pixellized form for display.

On the preferred high resolution color monitor 34, each pixel actually comprises adjacent primary-color phosphors on the face of a cathode-ray tube (CRT). The pixel signals can be combined in varying intensities and proportions to produce the full range of visible colors and shadings. Three electron beams sweep across and down the CRT face in a repetitive pattern, in what is known as raster scannning; pixel-determined signals control the intensity of each beam. The pixel information is synchronized with the position of the raster scan, so that pixels repeatedly appear on the screen in their correct locations.

Preferred embodiments of the color monitor 34 include 24-bit color models such as the Radius Color Display, which is known to be capable of simultaneous display of 16.7 million colors. Those skilled in the art will recognize that although the preferred display card 34B and monitor 34 need not be capable of displaying all 16.8 million shades simultaneously, the human eye can perceive small "differences" in adjacent colors. The large available-color universe contemplated by the preferred 24-bit embodiment therefore makes smooth transitions possible, and permits subtle shading in the display of photorealistic images, with smooth image color variation.

The display card 34B acts as the hardware interface between the microprocessor 40 and the color monitor 34. The RAM-based memory and digital-to-analog converters (RAM-DACs) transform the digital value associated with each pixel into an equivalent analog value ranging from pixel color "off" to "on". The display card 34B also includes other essential support and interface circuits (not shown), a microprocessor bus port 46M, and pixel port 46P.

Preferably the microprocessor unit 40 is from the MC68xxx family (a full 32-bit implementation of the M68000 Family of microprocessors from Motorola, Inc., Phoenix, Ariz.) The MC68020, for example, has a basic architecture comprising 32-bit registers and data paths, 32-bit addresses, a rich instruction set, and versatile addressing modes. Desirable features of the MC68020 are that its bit field data type accelerates bit-oriented applications, i.e., video graphics; its pipelined architecture offers a high degree of internal parallelism, thus allowing multiple instructions to be executed concurrently; its high performance asynchronous bus is non-multiplexed and operates at a full 32-bits; and its internal memory includes sixteen 32-bit general-purpose data and address registers and 5 special purpose control registers. The MC68020 addressing modes support high-level language structures, and a coprocessor interface is provided for accelerating the image manipulation functions in a typical graphics application. While the invention will be described with reference to the foregoing microprocessor, those skilled in the art will recognize that other microprocessors may be used.

Application of Color Management

Figure 5:
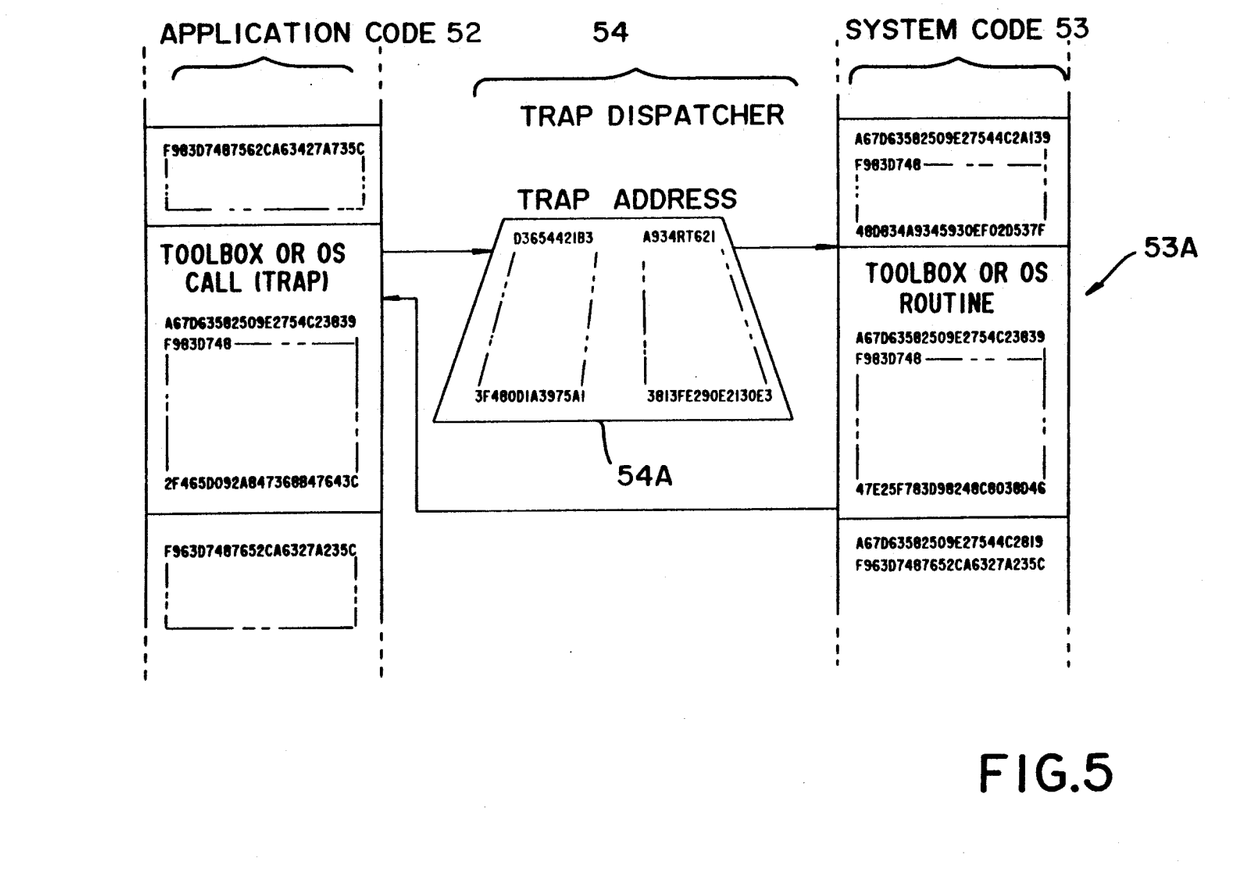
FIG. 5 illustrates a schematic representation of a conventional graphics rendering invocation process.
Figure 6:
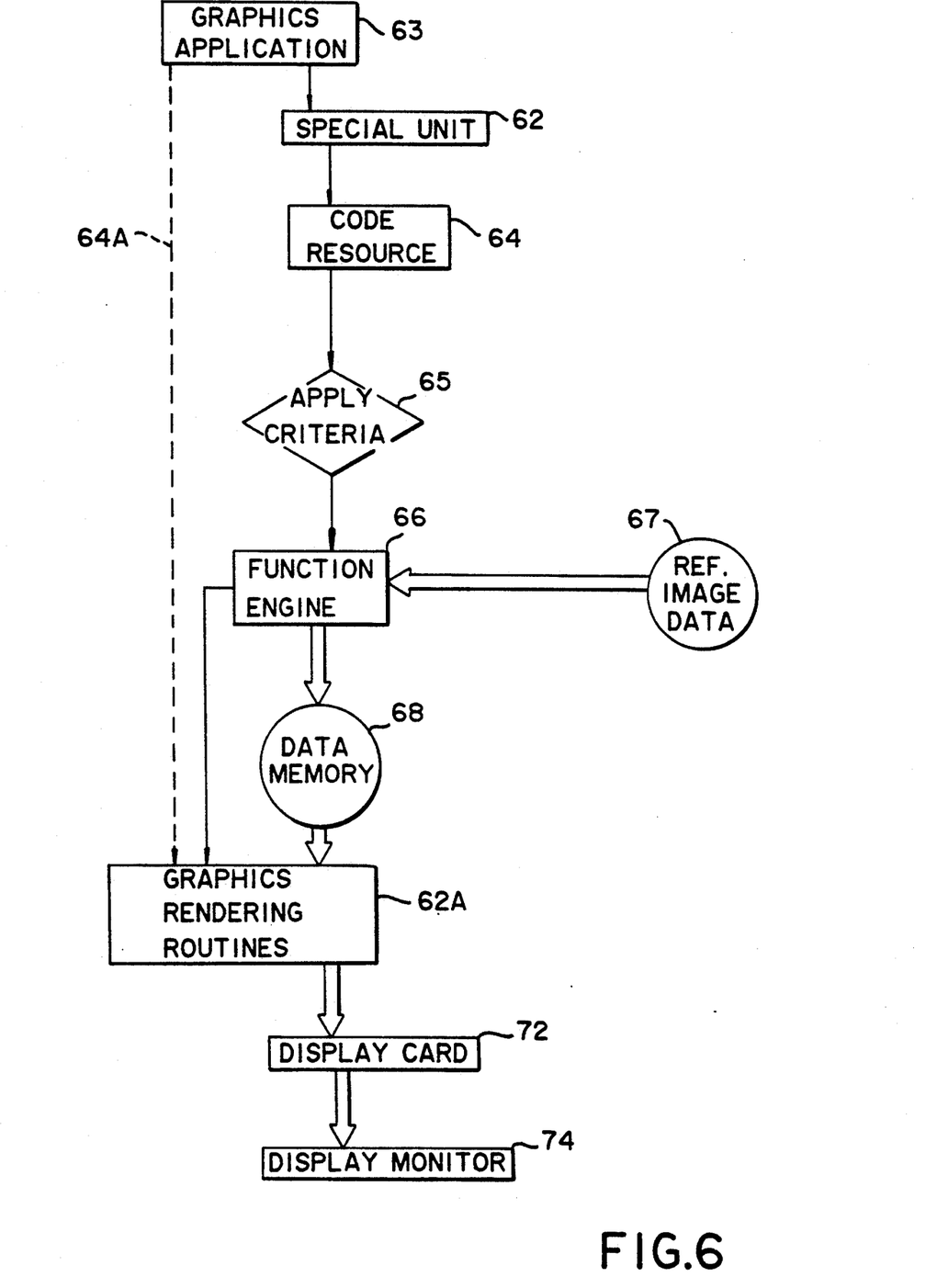
FIG. 6 shows a schematic representation of the preferred graphics rendering invocation process, including a method for selective interception of one or more graphics primitives according to the invention.

With reference now to FIGS. 5 and 6, a preferred method for selective interception of graphics a rendering operation for modification of image data, will be understood. In the preferred embodiment, data is modified according to the application of color management data transforms to achieve WYSIWYG color matching. Because the contemplated invention is preferably implemented on a workstation in the form of an Apple Macintosh computer, the following description is directed to the Macintosh operating system and hardware, with specific reference to graphics rendering routines, graphics applications software, and graphics hardware generally configured for operation with respect to the Macintosh. However, those skilled in the art will find that the teachings of the present invention may be realized with respect to other hardware and software configurations, such as those available from Sun Microsystems, Inc., Silicon Graphics, Inc., and others.

Several processes and events typically precede the interception sequence. The scanner and display monitor will have been color calibrated according to procedures already discussed in the Background of the Invention and with reference to FIG. 3B. Next, an original image will have been acquired in the form of, for example, a TIFF RGB data file from the scanner as known in the art; or, the Adobe Photoshop "acquire" feature may be used to read images from devices other than the scanner, i.e. from a magnetic disk or compact disk-read only memory (CD-ROM). The image data file will have been converted to the reference color space by the functional transform engine to provide reference image data in image memory. Conventional image processing, such as may be effected by the preferred graphics application software, may have been applied to the reference image data file. Exemplary but not limiting graphics application software would include Adobe Photoshop, which is suitable for effecting image acquisition, viewing, editing, and printing; or Quark XPress, for page layout and for printing complex documents that combine text and graphics.

The operator then may select the reference image data for preview on the display monitor. In the preferred embodiment, the rendering of the reference image data to the display is implemented within the Macintosh user interface via a collection of graphics rendering routines, known as Color Quickdraw. In conventional practice, the graphics application initiates the graphics rendering operation by calling one or more graphics primitives in QuickDraw, which are then implemented when process control shifts to Color Quickdraw.

However, and according to the present invention, the graphics application call to the graphics primitive is selectively intercepted, and the respective reference image data is modified, before the image data is subjected to the graphics rendering operation.

The Trap Mechanism

To facilitate a better understanding of the invention, the conventional graphics rendering call process will first be described with respect to FIG. 5.

Color QuickDraw defines an extended data structure called a pixel map (PixMap), which describes a pixel image and associated information in the coordinate plane. In addition to the dimensions and contents of a pixel image, the pixel map also includes information on the storage format, depth, resolution, and color usage of the image. Most applications do not write directly to the PixMap; rather, they modify it by drawing in the window associated with PixMap. PixMap can be passed to CopyBits, QuickDraw's fundamental graphics primitive. CopyBits copies pixels directly from one bit map (the source) to any rectangle in another bit map (the destination), in any of eight transfer modes and with optional scaling and clipping.

In conventional practice, the desired graphics primitives are accessed via a software trap mechanism provided by the host central processing unit (CPU). A software trap is executed, and based on the trap number, a memory address is formed. The memory address references a memory location that contains the address of a trap dispatcher, and software control is passed to the dispatcher. The content of the trap dispatcher can be a QuickDraw graphics rendering operation or another Macintosh system service or event handler.

At the machine level, a call to a graphics primitive is translated into subroutine jumps to the appropriate addresses in the Macintosh ROM. All references from application code 52 to a graphics rendering operation 53A in system code 53 are made indirectly through a trap dispatcher 54, which looks up the addresses of the graphics primitives in the trap dispatch table 54A. The trap dispatch mechanism allows the graphics primitives to be moved to different locations in system code in read only memory (ROM), or be replaced altogether by routines based in random access memory (RAM), without disturbing the operation of the graphics application program.

Each type of trap has its own trap dispatcher 54. The addresses of the various trap dispatchers are called trap vectors, and are kept in a vector table in the first kilobyte of memory. When a trap occurs, the processor fetches the vector for that type of trap from the vector table and uses it to locate the proper dispatch routine to execute. On completion, the trap dispatch routine restores the internal state of the microprocessor, using state information and return address saved earlier, and resumes normal execution from the point of suspension.

Software resources of type "INIT" contain system initialization routines. Whenever the Macintosh system is started up (such as when the power is turned on), all "INIT" resources that are found in the system folder are executed. Information about the locations of various routines is found in ROM; when the system starts up, this encoded information is expanded to form the trap dispatch table 54A. Because the trap dispatch table resides in RAM, individual entries in the table can be "patched" to point to addresses other than the original ROM address. This allows changes to be made in the ROM code: at startup time, for example, the system can load versions of individual routines from the Sytem file into RAM and then patch the trap dispatch table to point to them.

Selective Interception of QuickDraw Calls

With reference now to FIG. 6, it will be appreciated that a method of selectively intercepting the graphics rendering operation may be implemented to achieve image data modification according to the invention. The preferred modification of color image data is effected by a color management system via the application of color transforms. In FIG. 6, data flow is indicated by broad flow lines, and process control is indicated by narrow flow lines.

In the preferred embodiment, color correction is applied to the image data that forms a Macintosh image window, while leaving the remainder of the monitor screen display area unchanged. It should be noted, however, that the present invention is not limited to the implementation of color management, and those skilled in the art will recognize that the contemplated image data modification may be directed to other image processing functions known in the art such such as unsharp masking, filtering, warping, rotation, scaling, etc.

According to the present invention, an executable program, termed a special INIT 62, is provided in the system code. The special INIT is built of two executable resources: an INIT resource that is automatically loaded and executed at system start-up, and a trap dispatcher CODE resource 64 that is installed by the INIT resource. The INIT resource extinguishes at its completion, but the CODE resource 64 remains resident to intercept CopyBits traps.

The special INIT 62 is designed to replace the trap addresses of certain graphics primitives in the graphics rendering routines (collectively indicated as 62A) with the address of the CODE resource 64 which can then perform as a special trap dispatcher. Thus, whenever a graphics primitive trap is executed by a graphics application 63, the trap vectors to the CODE resource 63 instead of to the designated graphics primitive procedure in the rendering routines 62A.

Process control is thereby directed to the special CODE resource 63 defined by the special INIT 62. This direction is made with a reference to the reference image data in memory 65, and the reference image data destination, as a calling argument. (The graphics application 63 would conventionally expect process control to be passed to the graphics primitive, in a conventional process path 64A indicated by a broken flow line, to distinguish it from the process control effected according to the invention).

On receipt of control, the CODE resource 63 applies predefined criteria 65 (which are described hereinbelow) to determine the circumstances of the graphics primitive call and whether the image data is appropriate for application of the preview transforms found in the functional transform engine 66.

After a determination is made that the criteria are met, image data modification is invoked and the appropriate image data is modified according to image data preview transforms implemented in the functional transform engine 66. (Image data that does not meet the criteria is transferred through the functional engine without modification.) The invocation of one or more specific preview tranforms is made with reference to the reference image data stored in image data memory 67 as a calling argument. The functional engine 66 thereafter effects the deposit of the modified and unmodified portions of the image data in a processed image data memory 68.

Process control is then passed to one or more of the conventional graphics primitives in rendering routines 62A for rendering the processed image data by use of the calibrated display graphics hardware (principally, the display card and monitor 74.) (In the preferred embodiment, process control passes typically to a graphics primitive known as the CopyBits procedure). The display hardware is operated according to conventional practice, with the exception that the preview image rendered on the display hardware is partially or wholly formed from modified (e.g., color-managed) image data.

Because the image data is selectively modified before a graphics rendering operation takes place, the requisite image data color management is effected in a fashion that is transparent to both the operator and to the application. No user intervention or alterations to the graphics application software is required.

Graphics Rendering Call Criteria

The criteria to be met, before the process control is diverted to the functional transform engine 66, are:

1) The current graphics application name matches the selected application name (e.g., Adobe Photoshop).

This criterion is met by locating and determining the current application name that is stored by the Macintosh Segment Loader in the global variable known as CurApName.

2) The base address of the reference image data is not a display device base address.

A graphics device description includes a PixMap of the displayable pixels on the device. The PixMap is described in part by a physical base address and a bounding rectangle. The list of graphic devices and the base address of the active graphic device are made available to applications through global variable definitions. The source or destination PixMap points to the screen if its baseAddr is equal to the global ScrnBase. When control is vectored to the CODE resource 63, the reference image data address is compared to the base address of the active display device (display monitor 74) to ensure that it is not within the screen area.

3) The destination of the reference image data is a display device.

This criterion is met if the destination is confirmed as a PixMap whose base address is the display screen base address.

4) The reference image data is color image data.

The data is confirmed as color data if the mask 0xC000 is set in the PixMap rowBytes field.

5) The front-most BitMap or PixMap is within a visible window.

The Macintosh maintains a list of the preview display devices (such as the display monitor 74) that are found at system startup, as well as those that are defined thereafter. A list of Color QuickDraw Windows for each running application is also maintained. The front-most Window on an active graphic device is the active Window, and the address of the Window is provided to the application as a global variable. Visibility (i.e., whether or not a given window in onscreen) is defined by a component of the Window description. The list of Windows is therefore examined to confirm the active BitMap or PixMap is described by a visible window.

Functional Engine

Examples of readily-coded image processing algorithms that may be used for such purpose are described in the published literature, such as in *Digital Image Processing* by William K. Pratt, in particular, Chapters 4, 12 and 16, respectively entitled "Image Sampling and Reconstruction," "Image Enhancement" and "Luminance, Color, and Spectral Image Restoration," 1978 John Wiley and Sons, ISBN 0-471-01888-0; and in *Digital Image Processing* by Rafel C. Gonzalez, in particular, Chapter 4, entitled "Image Enhancement," 1983 Addison-Wesley Publishing Company, Inc. ISBN 0-201-02596-5.

Color management systems and related algorithms are known in the art. Accordingly, it is a feature of the present invention that the contemplated functional engine 66 may be devised by those skilled in the art to apply known image processing algorithms according to the designer's preference so as to achieved the desired color matching of hard and soft copy image reproductions. In a preferred embodiment, the functional engine 66 is constructed according to the teachings of the following co-pending, commonly-assigned U.S. Patent Applications, the disclosures of which are included herein by reference:

COLOR IMAGE PROCESSING SYSTEM FOR PREPARING A COMPOSITE IMAGE TRANSFORMATION MODULE FOR PERFORMING A PLURALITY OF SELECTED IMAGE TRANSFORMATIONS, U.S. patent application Ser. No. 07/590,375, filed in the names of Newman et al. on Sept. 28, 1990. An image processing system is disclosed as employing lookup tables for transforming image data from a first coordinate space to a second coordinate space. The disclosed system enables the user of an image processing system to dynamically create a single transform definition that embodies a plurality of selected image transformations. According to the teachings of the disclosure, an array of modified pixel values may be created in response to an array of input pixel values. The disclosed method features the steps of receiving a user's selection of an image transformation to be performed on the array of input pixel values. In response to the user's selections, a plurality of transform definitions are automatically selected from stored transform definitions. Each transform definition includes sample values representing an input/output relation of a predetermined image transformation. From the selected transform definition, a composite transform definition is generated containing sample values of an input/out relationship of a composite image transformation that is equivalent to the several image transformations effectively selected by the user.

Also, A SYSTEM FOR PERFORMING LINEAR INTERPOLATION, U.S. patent applications Ser. No. 385,242 filed on Apr. 29, 1991, and Ser. No. 696,299, filed on Jul. 25, 1989, both in the names of Newman and McLafferty. An interpolation system is disclosed as generating an interpolated value in response to an input value. The interpolation system includes a function value store comprising a plurality of function value storage tables for storing function values for alternating domain coordinate values in a domain. An address generator, in response to an input value, generates address signals identifying locations in the function value storage tables to enable the function value storage tables to transmit function values in parallel. An interpolator receives function values transmitted in parallel by the function value storage tables and the input value and generating in response thereto the interpolated value.

The invention has been described in detail with particular reference to preferred embodiments thereof, but it will be understood that variations and modifications can be effected within the spirit and scope of the invention.

What is claimed is:

1. In a color imaging system, a method for modification of image data representative of a selected color image to be rendered on an image reproduction means by one or more graphics rendering routines, comprising the steps of:
   implementing a system initialization program executable for installing first and second resources;
   executing the system initialization program to install the first and second resources,
   the first resource being executable for intercepting process control otherwise directed to the graphics rendering routine and for redirecting the process control to the second resource, the second resource being executable for determining whether or not an invocation of the graphics rendering routine fulfills predetermined criteia;
   upon an invocation of the graphics rendering routine, executing the first and second resources respectively to intercept the process control and to perform said determination;
   in response to the criteria being met, processing selected image data to provide modified image data;
   directing process control to the graphics rendering routine; and
   rendering at least the modified image data on the image reproduction means.

2. The method of claim 1, wherein the first resource executable for selective interception of a graphics primitive call.

3. The method of claim 2, wherein the determination step further comprises the step of determining whether the graphics primitive listed within an allowed graphics primitive set.

4. The method of claim 2, wherein the determination step further comprises the step of evaluating whether the graphic primitive call includes attribute information included in a predetermined set of image data attributes.

5. The method of claim 2, wherein the determination step further comprises the step of evaluating whether the graphic primitive call is directed to rendering an image on an appropriate image reproduction means.

6. The method of claim 1, wherein the processing step further comprises the step of storing the modified image data in modified data memory, and the rendering step further comprises retrieving the modified image data from the modified image data memory.

7. The method of claim 1, wherein the processing step further comprises the step of implementing at least one functional transform with respect to the selected image data.

8. The method of claim 7, wherein the functional transform is adapted for implementing color management of the selected image data, the color management being directed to WYSIWYG color correction of the image rendered on the image reproduction means with respect to a second image reproduction provided on a second image reproduction means.

9. The method of claim 8, wherein the first and second image reproductions are visually matched.

10. The method of claim 8, wherein the first image reproduction is a soft copy image reproduction and the second image reproduction is a hard copy image reproduction.

11. The method of claim 1, wherein the selected color image is selected according to the steps of:
    acquiring an original image to provide original image data in a given color space;
    applying an input transform to the original image data to format same to a device-independent color space; and
    storing the formatted image data in a reference data base for use as image data subject to at least one of the processing and rendering steps.

12. In a color imaging system, a method of implementing color management of color image data representative of an image selected by a graphics application for rendering according to a graphics primitive, comprising the steps of:
    implementing a resource for receiving the graphics primitive call from the graphics application;
    operating the resource to redirect the graphics primitive call to a call dispatching routine;
    operating the call dispatching routine to determine whether or not the graphics primitive call fulfills a predetermined set of criteria;
    in response to a fulfillment of the criteria, applying color management algorithms to the image data to provide color-managed image data; and
    directing process control to the graphics primitive for rendering the color-managed image data on an image reproduction means.

13. In a color imaging system, apparatus for modification of image data representative of a selected color image to be rendered on an image reproduction means by one or more graphics rendering routines, comprising:
    system initializing means for installing first and second resources, the first resource being executable for intercepting process control otherwise directed to the graphics rendering routine and for redirecting the process control to the second resource, the second resource being executable for determining whether or not an invocation of the graphics rendering routine fulfills predetermined criteria;
    means, responsive to an invocation of the graphics rendering routine, for executing the first and second resources respectively to intercept the process control and to perform said determination;
    means, responsive to the criteria being met, for processing selected image data to provide modified image data;
    means for directing process control to the graphics rendering routine; and
    means for rendering at least the modified image data on the image reproduction means.

* * * * *